United States Patent [19]

Lundgren

[11] 3,973,308

[45] Aug. 10, 1976

[54] CUTTING TOOL

[75] Inventor: Evert Gustav Lundgren, Sandviken, Sweden

[73] Assignee: Sandvik Aktiebolag, Sandviken, Sweden

[22] Filed: Apr. 8, 1975

[21] Appl. No.: 566,054

[30] Foreign Application Priority Data

Apr. 24, 1974 Sweden .......................... 7405478

[52] U.S. Cl. ................................................. 29/95 R
[51] Int. Cl.² ........................................... B26D 1/00
[58] Field of Search .......... 29/105 A, 105 R, 103 A, 29/95 R, 96

[56] References Cited
UNITED STATES PATENTS

| | | | |
|---|---|---|---|
| 2,677,170 | 5/1954 | Kuns | 29/95 R |
| 3,128,804 | 4/1964 | Scott | 29/95 R X |
| 3,792,514 | 2/1974 | Ushijima | 29/95 R |
| 3,815,191 | 6/1974 | Holma | 29/95 R |
| 3,827,119 | 8/1974 | Bennett | 29/105 R |
| 3,885,281 | 5/1975 | Stambler | 29/95 R |

*Primary Examiner*—Harrison L. Hinson
*Attorney, Agent, or Firm*—Pierce, Scheffler & Parker

[57] ABSTRACT

The cutting insert of the present invention has such shape that use of the same in a machining operation creates a greater than conventional surface pressure on the contact surface of the insert, such pressure causing an extremely thin, localized, area of the contact surface to attain an elevated temperature creating a flow layer therein. Such area reduction is effected by the formation on the contact surfaces of the notches inside of the cutting edge of the insert.

4 Claims, 10 Drawing Figures

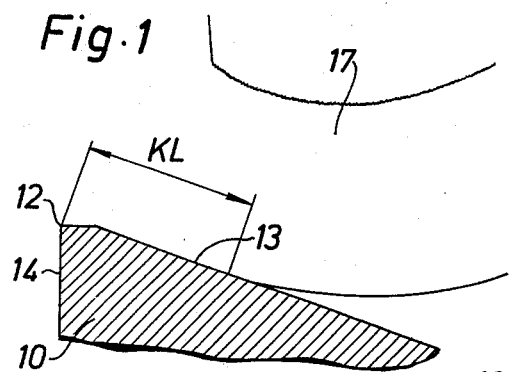
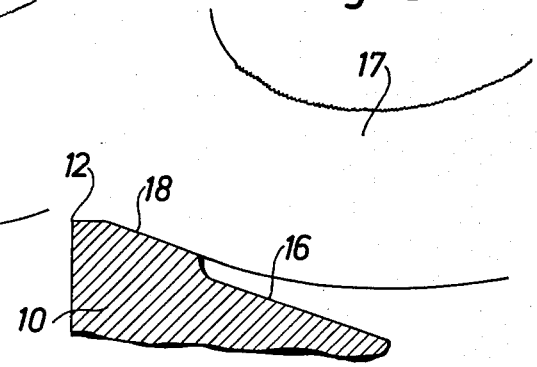
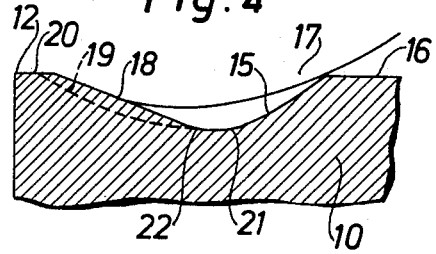
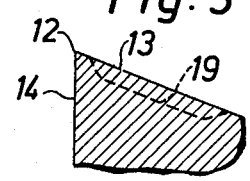
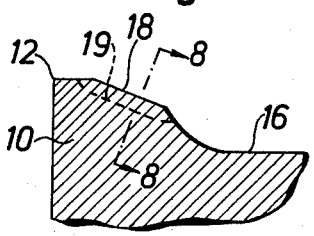
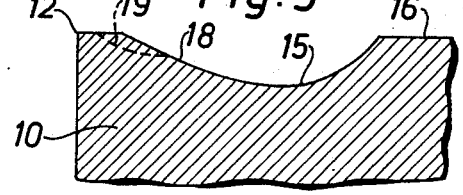
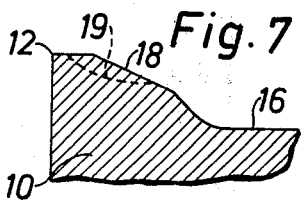
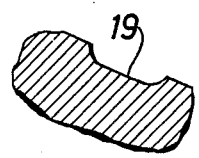
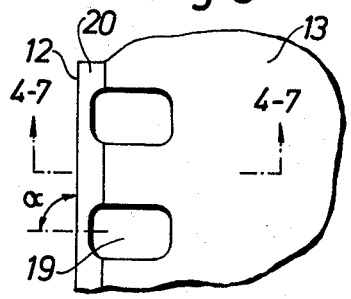
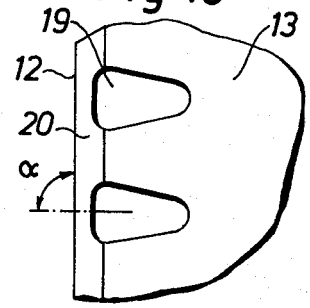

CUTTING TOOL

The present invention relates to cutting tools as inserts for chipforming machining of work-pieces, usually of metal, and, in particular, to triangular, square, rhombic, rhomboidic or other forms of indexible cutting inserts having at least one cutting edge.

In such cutting tools or inserts, the cutting edges are formed by the transition between the side surfaces and the end surfaces of the cutting insert, the side surfaces being chip faces or such surfaces which are in contact with the formed chip at the cutting operation, the end surfaces being clearance faces in relation to the work-piece.

The cutting insert of the present invention is so modified that the mentioned chip faces or contact faces have a particularly favorable form in regard to the cutting forces and to wear of the cutting tool.

It is known that the load acting upon the chip face of the cutting insert during the cutting operation is decisive for the cutting forces as well as for the wear. The friction conditions in the contact surface between the chip and the chip face of the tool are, thus, of great importance. If the friction could be decreased, the cutting forces as well as the wear would decrease. If the temperature is sufficiently high, a flow layer will be formed on the contact surface, which layer acts as a "lubricating film" affording reduced friction. A raise of the temperature in the contact surface between the chip and the tool can thus decrease both cutting forces and wear. A suitable temperature for the mentioned flow layer formation often can not be reached, however, because the generation of heat will be so great that the wear by diffusion of material between tool and chip - becomes predominant, or that the cutting edge becomes plastically deformed.

The cutting insert according to the invention has been given such a shape that the above-mentioned problems are essentially eliminated. In the new construction the area of the contact surface has been reduced in a systematic way. By this reduction of the contact surface the surface pressure is correspondingly increased, which pressure causes the temperature in the contact zone to raise within an extremely thin layer or localized area thereon in the use of the cutting tool. This increases the flow layer formation, which brings about a decrease in friction and in heat generation. The reduced heat generation, but at the same time an increased temperature in a very localized area, as in the contact zone being reduced to its extension, mean that an optimum temperature - favorable for flow layer formation - is obtained without the earlier mentioned drawbacks. The heat generation is thus not so great that the cutting edge is plastically deformed or that the diffusional wear becomes predominant.

The invention will be further disclosed in the following description, taken with the attached drawings, showing:

FIG. 1 Profile of cutting tool and chip, indicating the contact length KL between chip and tool;

FIG. 2 Profile of cutting tool with reduced contact length;

FIGS. 3–7 Profile of cutting tool with schmatically indicated notches in the chip face;

FIG. 8 Profile of notches situated on the chip face, alternative embodiments, along the section 8—8 in FIG. 6; and FIGS. 9–10 Horizontal view of the cutting tools according to FIGS. 4–7 showing notches situated on the chip face.

The mentioned contact between chip and tool during the cutting operation, stated as the contact length KL of the chip against the chip face of the tool,- see FIG. 1,- is determined, among other factors, by the geometry of the cutting tool, the material of the work-piece and of the tool, and the size of the feed. At small feeds, the contact length may be up to ten times, as an example, the size of feed. At increased feed, the contact length will decrease in relation to the feed down to once (= as large as), as an example, the size of the feed.

Several types of cutting inserts are previously known in which the chip face has such a form that the contact length is "broken" or shortened and thus the contact surface reduced. Here may be mentioned cutting inserts having chip breaker grooves, depressions, cuts, etc., which in different ways deform, break or plastically work the chip. The chip breaker grooves or similar which are often present on the chip surface of a tool may thus mean that the contact surface has been essentially reduced because of the broken contact length between chip and tool. This may be the fact, particularly in those cases where the chip passes over the groove or the depression without being broken or deformed above the normal upsetting or plastic deformation of the chip in cutting or machining.

It is also known to shorten the contact length in a more concrete way and thus reduce the contact surface. FIG. 2 illustrates such a previously known way. In spite of the smaller heat generation caused by the reduced contact surface, the heat transfer to the point of the tool is essentially unaltered in this known case, however, because the contact surface has been concentrated nearer to the cutting edge, meaning that the risks of plastic deformation of the cutting edge remain.

In the cutting tool according to the invention the reduced contact surface has been obtained by means of notches in the chip face of the insert. These notches are so formed that the chip can pass or slide over them without being broken or further deformed, which is an essential difference compared to known embodiments in which a breaking or deformation of the chip has been attained or at least sought to attain, but in which a reduced contact surface may incidentally have been included.

The notches or depressions in the chip face of the cutting tool according to the invention do not break through the cutting edge but start in the chip face. By this measure, the chip will not be deformed or plastically worked by the depression per se, thus not being worked beyond the chip upsetting or the plastic deformation of the chip involved in cutting operation. To avoid tendencies to chip breaking, the depressions have the shape of several notches being separated from each other. Usually, the longitudinal extension is essentially perpendicular to the cutting edge. Sometimes, a similar effect may be obtained by supplying the chip face with a number of elevations or beads in an equivalent way.

The cutting tools or inserts 10 shown in FIGS. 1–10 each have at least one corner with one or more cutting edges 12 formed by the transition between the side surfaces or chip faces 12 of the cutting tool and its end surfaces or clearance faces 14. In many cases the cutting tools are provided with chip breakers 15 which are relatively long grooves or similar depressions extending along the cutting edge and connecting to a central part 16 of the cutting tool.

FIG. 1 illustrates the contact between the formed chip 17 and the chip face 13 of the tool, indicated as the contact length KL.

FIG. 2 shows schematically a previously known tool, in which the contact length 18 along the chip face has been reduced by a depression of the central or middle part 16 of the tool.

FIG. 3 schematically shows an embodiment according to the present invention, the chip face 13 being provided with notches 19 which connect to the mentioned surface 13 just inside the cutting edge 12. The notches, whose longitudinal direction is essentially perpendicular to the cutting edge, are "open" or "closed" during the cutting operation depending upon whether their length is greater or smaller than the contact length of the chip.

FIG. 4 shows an embodiment in which the cutting edge 12 is provided with a plain face or land 20. The cutting tool is also provided with a chip breaker 15 which connects to a central part 16 of the tool. The notches 19 start at the plain face just inside the cutting edge and extend to the bottom 21 of the chip breaker. Because the chip 17 often does not go down into the bottom of the chip breaker but loses its contact with the chip breaker earlier, the notches will have greater extension than the contact length 18 of the chip, meaning that they are "open" in their bottom end 22 in the cutting operation.

In FIG. 5 there is shown an embodiment in which the extension of the notches 19 in longitudinal direction is normally smaller or shorter than the contact length 18 of the chip, meaning that the notches are completely closed in the cutting operation. By suitable design of the notches it is possible to create a hydrodynamical pressure which increases the carrying capacity of the flow layer between the chip and the contact surface of the tool which in its turn lowers the friction.

In FIG. 6 and FIG. 7 there are shown embodiments of cutting tools having reduced contact length 18 and chip breaker in the form of a depressed central part 16 of the cutting tool. In FIG. 6 there are shown notches 19 which are open in the cutting operation, while FIG. 7 shows notches 19 which are closed in the corresponding operation.

FIG. 8 shows three different embodiments of cross-sections of the open notches 19, illustrated in FIG. 6. The cross section of the notches has thus often the shape of the segment of a circle or an ellipse or has a plain bottom and rounded edges or sides.

In FIGS. 9 and 10 there is shown in horizontal projection a part of the chip surface 13, by which also the cutting edge 12, the plain face or land 20 and the notches 19 are illustrated. The longitudinal direction of the notches 19 forms the angle δ with the cutting edge. The angle δ normally has a size of 45°–90° but is often near 90°. In FIG. 10 there is shown an embodiment wherein the notches 19' have a decreasing width seen in the direction of motion of the chip. This form gives an increase of the hydrodynamic pressure particularly in the case of closed notches.

I claim:

1. In a cutting tool for chipforming machining of metal work-pieces, said tool (10) having at least one corner with at least one connected cutting edge (12) formed by the transition between side surfaces (13) and an end surface (14) of the cutting tool, said side surfaces being chip faces or contact surfaces (18) between the cutting tool (10) and the formed chip (17) in the cutting operation, said end surfaces (14) being clearance faces, the improved formation wherein the chip face (13) or the contact surface (18) has several depressions (19) or notches separated from each other and situated inside and spaced from the cutting edge (12), said depressions, when in contact with the chip, failing to break, plastically deform or otherwise work or form the chip.

2. In a cutting tool as defined in claim 1, the improvement wherein the longitudinal direction of the depressions (19) is essentially perpendicular to the cutting edge (12).

3. In a cutting tool as defined in claim 1, the improvement wherein the depressions (19) have decreasing width and/or depth in the direction of motion of the chip (17).

4. In a cutting tool as defined in claim 1, the improvement wherein the depressions (19) have a cross-section which is a segment of a circle.

* * * * *